(12) United States Patent
Strickland

(10) Patent No.: US 11,507,147 B1
(45) Date of Patent: Nov. 22, 2022

(54) COMPUTING CHASSIS INCLUDING REMOVEABLE MIDPLANES

(71) Applicant: Dell Products L.P., Round Rock, TX (US)

(72) Inventor: Stephen Edward Strickland, Foxborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/367,864

(22) Filed: Jul. 6, 2021

(51) Int. Cl.
*G06F 1/18* (2006.01)
*G06F 1/16* (2006.01)

(52) U.S. Cl.
CPC ............ *G06F 1/181* (2013.01); *G06F 1/1613* (2013.01)

(58) Field of Classification Search
CPC ................................ G06F 1/181; G06F 1/1613
See application file for complete search history.

(56) References Cited

U.S. PATENT DOCUMENTS

| | | | |
|---|---|---|---|
| 10,622,025 B2* | 4/2020 | Gopalakrishna | H05K 7/1488 |
| 10,966,352 B2* | 3/2021 | Iyengar | H05K 7/20336 |
| 2017/0269645 A1* | 9/2017 | Peng | G06F 1/187 |
| 2018/0239734 A1* | 8/2018 | Killen, Jr. | G06F 13/409 |
| 2019/0121402 A1* | 4/2019 | Puligundla | H05K 7/1422 |
| 2019/0294578 A1* | 9/2019 | Arnouse | G06F 1/1628 |
| 2021/0287720 A1* | 9/2021 | Wang | H05K 7/1424 |

* cited by examiner

*Primary Examiner* — Rockshana D Chowdhury
(74) *Attorney, Agent, or Firm* — McDermott Will & Emery LLP

(57) ABSTRACT

A computing chassis, including: a first storage processor assembly; a second storage processor assembly; a first midplane, wherein the first storage processor assembly and the second storage processor assembly are coupled concurrently to the first midplane; and a second midplane, wherein the first storage processor assembly and the second storage processor assembly are coupled concurrently to the second midplane, wherein communication between the first storage processor assembly and the second storage processor assembly is through the first midplane and the second midplane independently.

14 Claims, 5 Drawing Sheets

COMPUTING CHASSIS INCLUDING REMOVEABLE MIDPLANES

BACKGROUND

Field of the Disclosure

The disclosure relates generally to an information handling system, and in particular, a computing chassis including removeable midplanes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a computing chassis, including: a first storage processor assembly; a second storage processor assembly; a first midplane, wherein the first storage processor assembly and the second storage processor assembly are coupled concurrently to the first midplane; and a second midplane, wherein the first storage processor assembly and the second storage processor assembly are coupled concurrently to the second midplane, wherein communication between the first storage processor assembly and the second storage processor assembly is through the first midplane and the second midplane independently.

Other embodiments of these aspects include corresponding systems and apparatus.

These and other embodiments may each optionally include one or more of the following features. For instance, the first midplane is positioned along a first edge of the computing chassis, wherein the second midplane is positioned along a second edge of the computing chassis, wherein the second edge is opposite to the first edge. At least a portion of the first storage processor assembly and the second storage processor assembly are physically defined between the first and the second midplanes. Further including a third midplane positioned along the first edge of the computing chassis, wherein the first storage processor assembly and the second storage assembly are coupled concurrently to the third midplane, wherein communication between the first storage processor and the second storage processor is through the first midplane, the second midplane, and the third midplane independently. Further including a third storage processor assembly, wherein the first storage processor assembly, the second storage processor assembly, and the third storage processor assembly are coupled concurrently to the first midplane, wherein the first storage processor assembly, the second storage processor assembly, and the third storage processor assembly are coupled concurrently to the second midplane. The first and the second midplanes are removable from the computing chassis. The second midplane is redundant to the first midplane. Further including one or more storage devices coupled to one or more of the first storage processor assembly and the second storage processor assembly.

Particular implementations of the subject matter described in this specification can be implemented so as to realize one or more of the following advantages. For example, data integrity is preserved, upgradability of midplanes is improved, life expectancy of midplanes is improved, and thermal efficiency/air transfer is improved.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
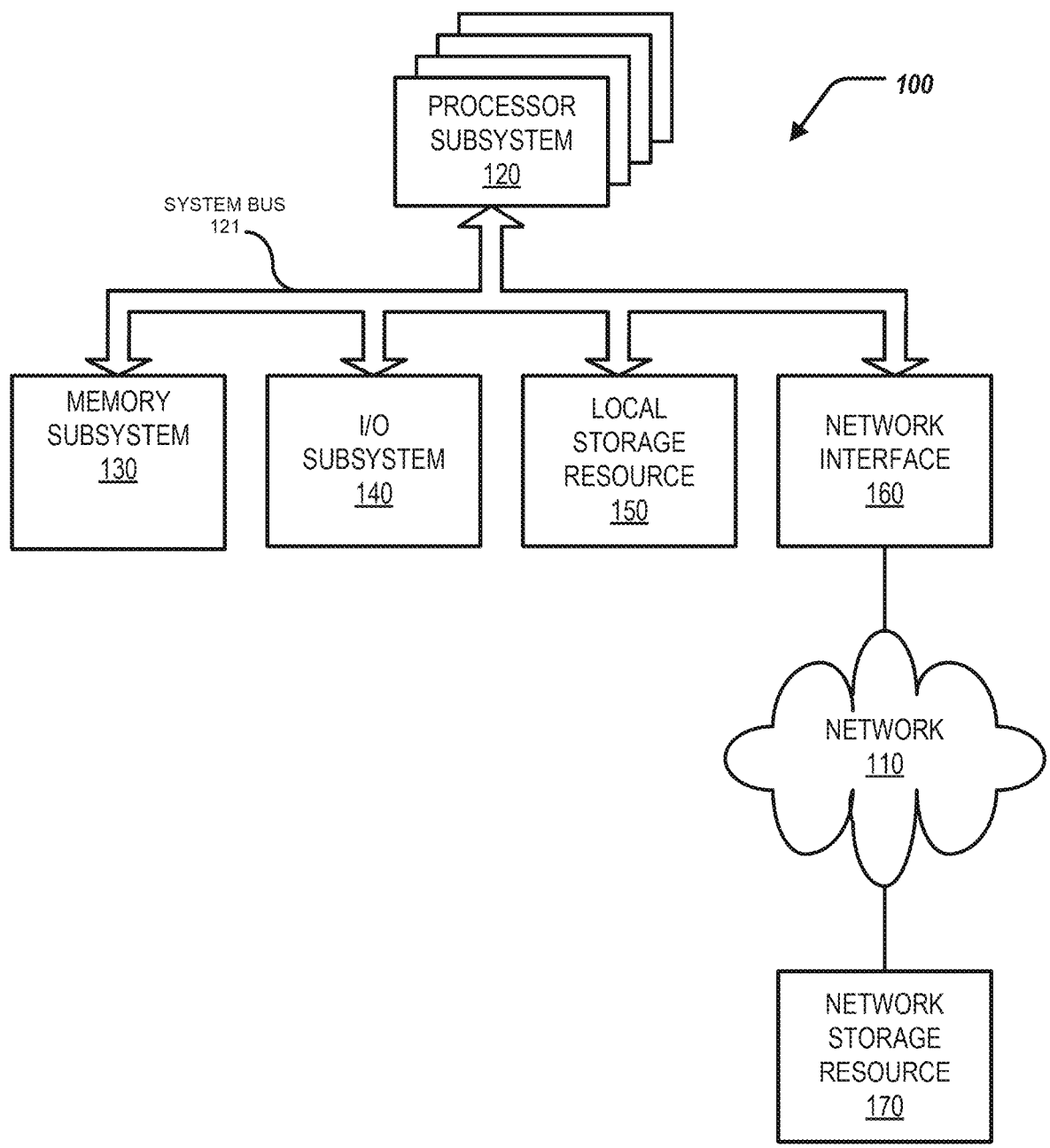
FIG. 1 is a block diagram of selected elements of an embodiment of an information handling system.

This disclosure discusses a computing chassis including removeable midplanes. In short, an information handling system can include a computing chassis. The computing chassis can include multiple storage processor assemblies for managing storage devices (e.g., ensuring redundancy of data stored by the storage devices). The computing chassis can further include multiple midplanes that are coupled to the processor assemblies such that the multiple storage processor assemblies can communicate with one another for management of the storage devices, described further herein. The midplanes can be redundant of one another such that when one of the midplanes were to be removed, or fail, the remaining midplane can be utilized for such communication.

Specifically, this disclosure discusses a computing chassis, including a first storage processor assembly; a second storage processor assembly; a first midplane, wherein the first storage processor assembly and the second storage processor assembly are coupled concurrently to the first midplane; and a second midplane, wherein the first storage processor assembly and the second storage processor assembly are coupled concurrently to the second midplane, wherein communication between the first storage processor assembly and the second storage processor assembly is through the first midplane and the second midplane independently.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
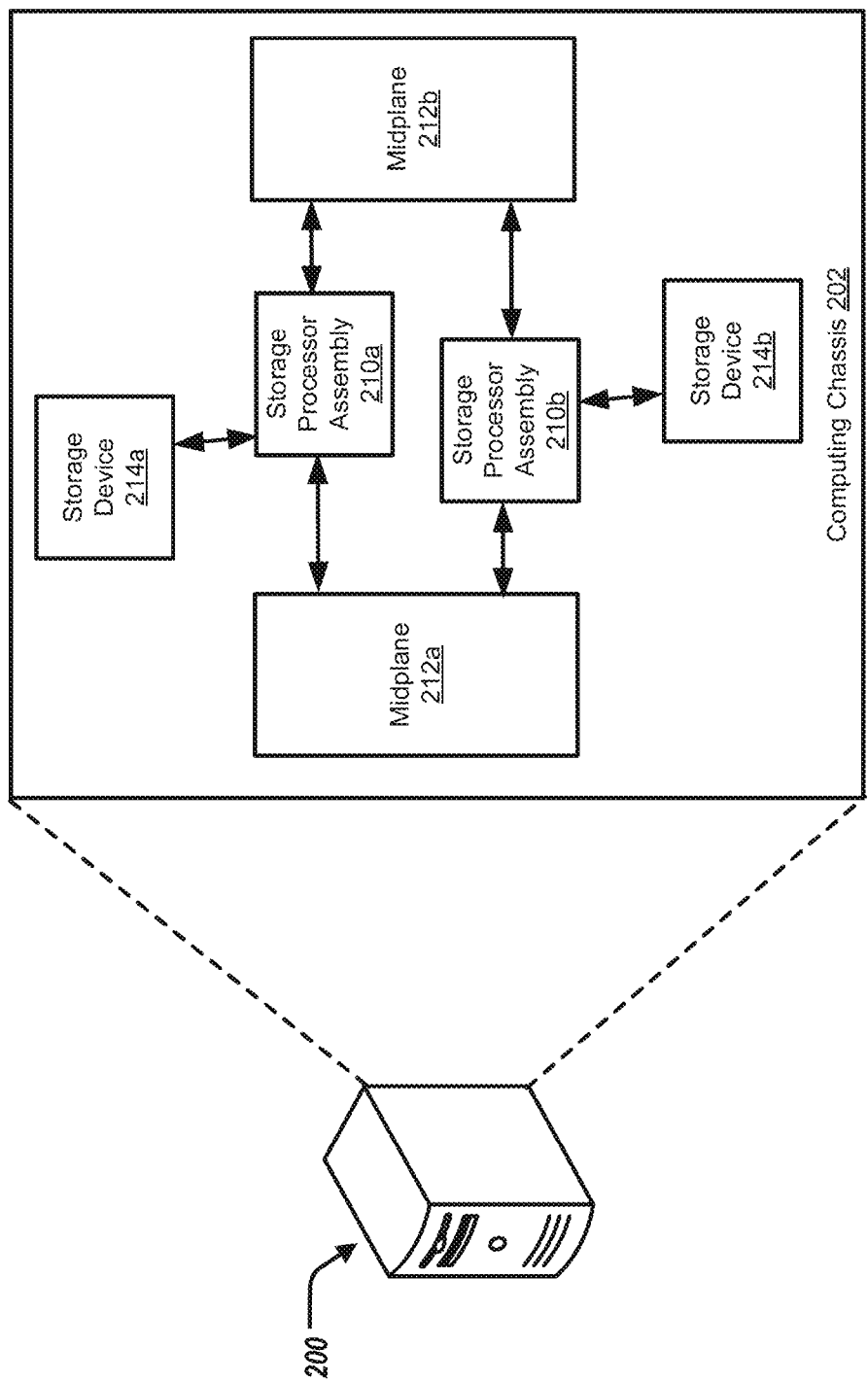
FIG. 2 illustrates a block diagram of an information handling system including a computing chassis having removeable midplanes.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, the information handling system 100 can include a computing chassis. The computing chassis can include multiple storage processor assemblies for managing storage devices (e.g., ensuring redundancy of data). The computing chassis can further include multiple midplanes that are coupled to the processor assemblies such that the multiple storage processor assemblies can communicate with one another for management of the storage devices, described further herein. The midplanes can be redundant of one another such that when one of the midplanes were to be removed, or fail, the remaining midplane can be utilized for such communication.

Turning to FIG. 2, FIG. 2 illustrates an information handling system 200. The information handling system 200 can include a computing chassis 202. In some examples, the information handling system 200 is similar to, or includes, the information handling system 100 of FIG. 1.

The computing chassis 202 can include a first storage processor assembly 210a and a second storage processor assembly 210b; however the computing chassis 202 can include any number of storage processor assemblies depending on the application desired (the first storage processor assembly 210a and the second storage processor assembly 210b collectively referred to as storage processor assemblies 210). The computing chassis 202 can further include a first midplane 212a and a second midplane 212b; however the computing chassis 202 can include any number of midplanes depending on the application desired (the first midplane 212a and the second midplane 212b collectively referred to as midplanes 212). The computing chassis 202 further includes a first storage device 214a (or first storage devices 214a) and a second storage device 214b (or second storage devices 214b); however the computing chassis 202 can include any number of storage devices depending on the application desired (the first storage device 214a and the second storage device 214b collectively referred to as storage devices 214).

The storage processor assemblies 210 can be in communication with the midplanes 212. The first storage processor assembly 210a is in communication with the first storage device 214a; and the second storage processor assembly 210b is in communication with the second storage device 214b.

Figure 3A:
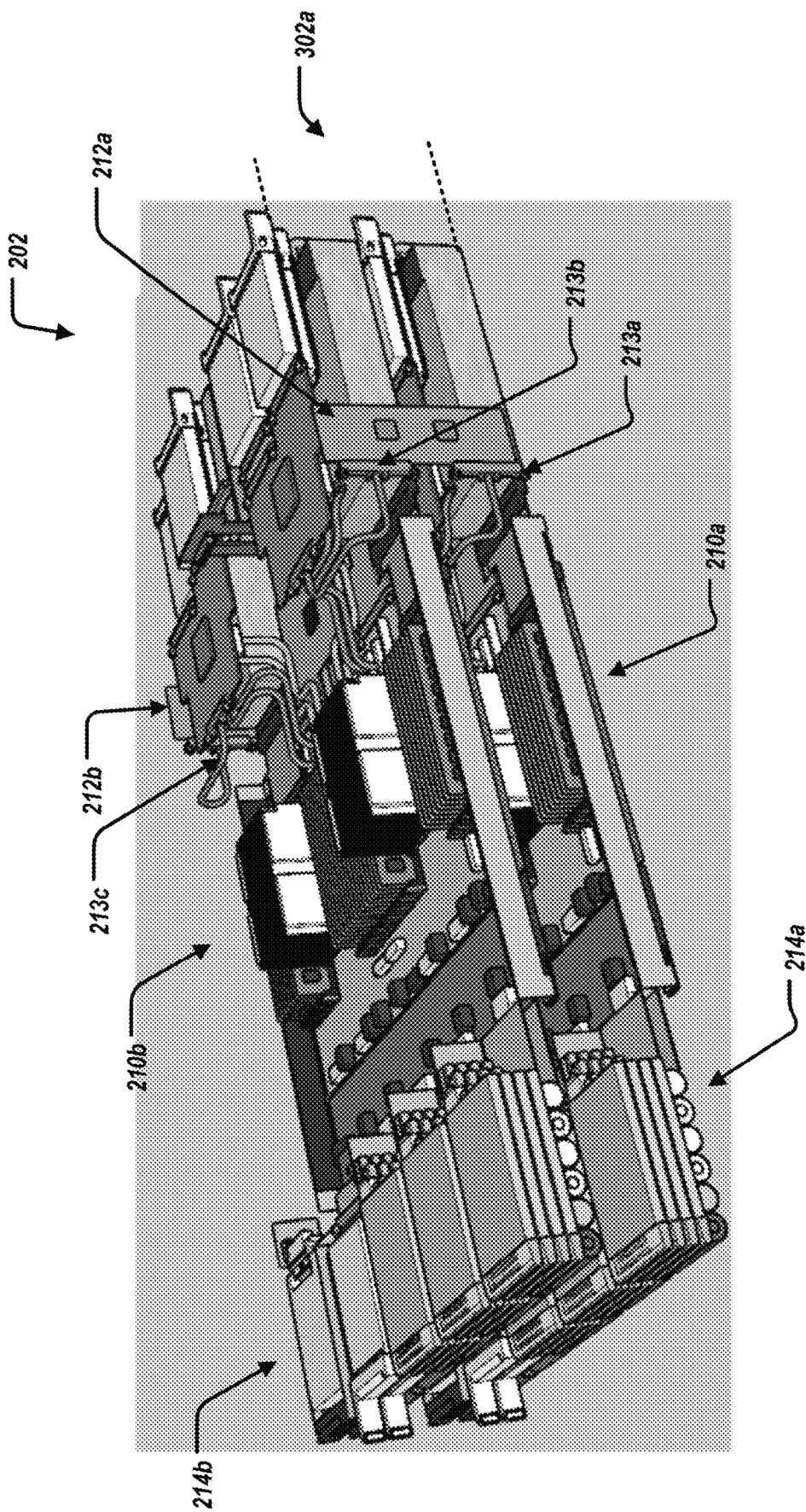
FIGS. 3A-3C illustrate respective views of the computing chassis having removeable midplanes.
Figure 3B:
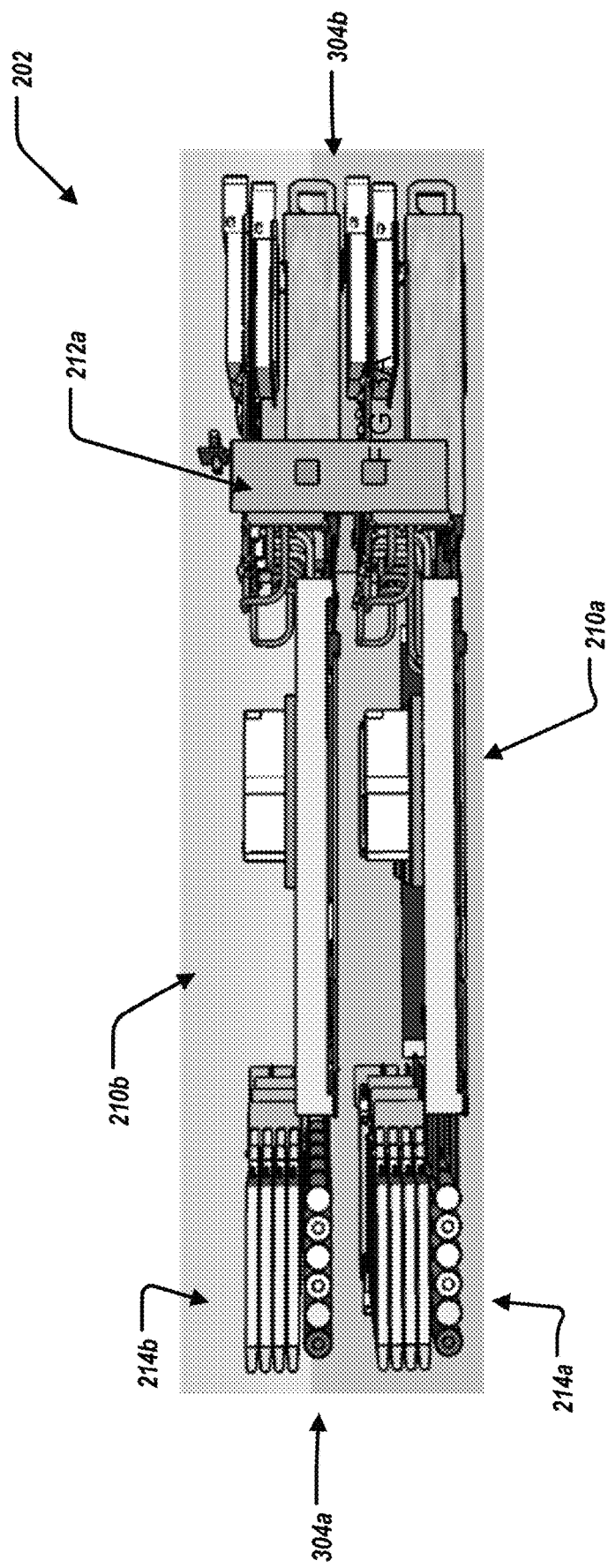
Figure 3C:
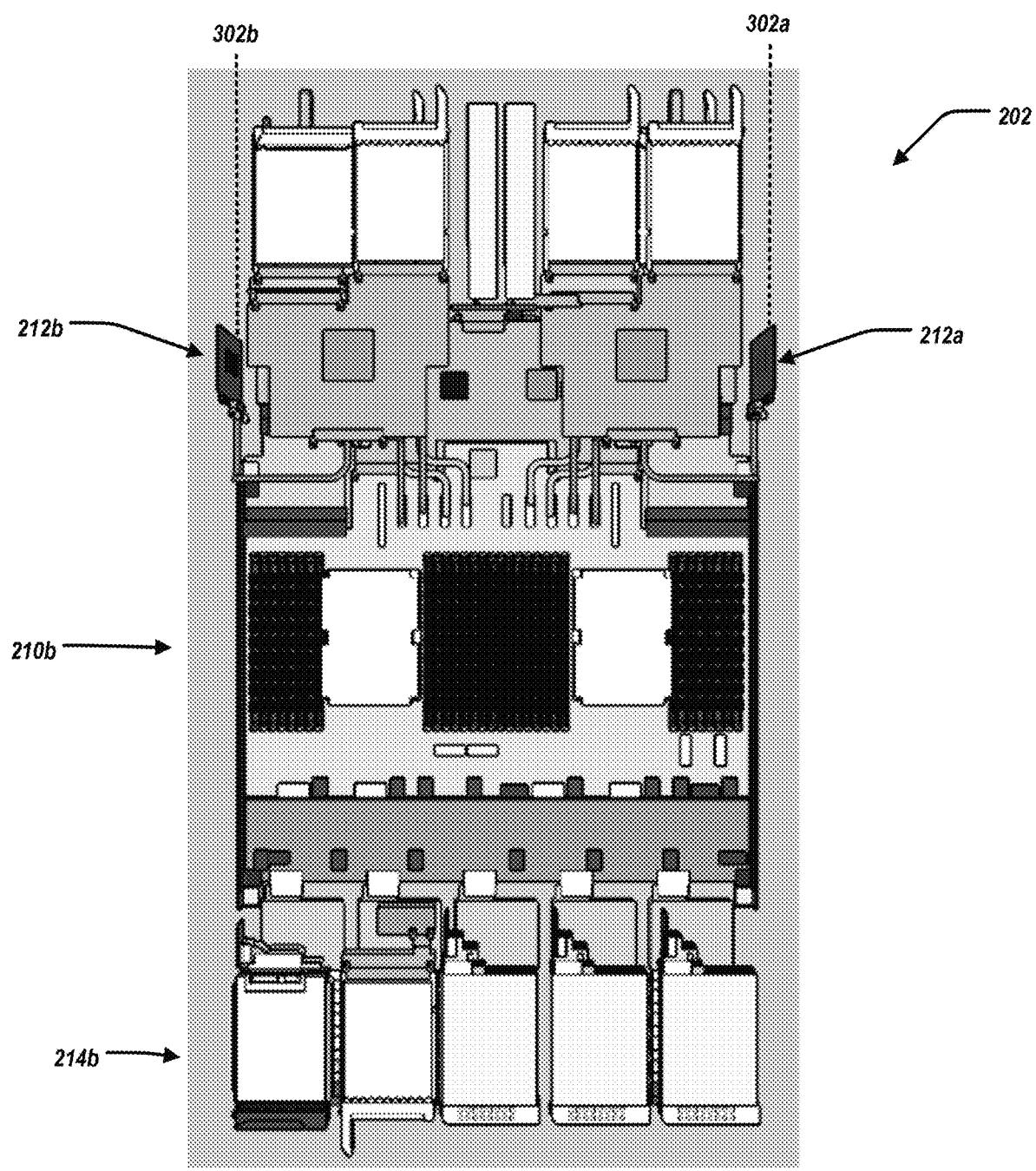

FIGS. 3A-3C illustrate the computing chassis 202. Specifically, FIG. 3A illustrates a perspective view of the computing chassis 202; FIG. 3B illustrates a side view of the computing chassis 202; and FIG. 3C illustrates a top view of the computing chassis 202.

As illustrated, the first storage processor assembly 210a is coupled to the first midplane 212a, and the second storage processor assembly 210b is coupled to the first midplane 212b. Specifically, the first storage processor assembly 210a and the second storage processor assembly 210b are coupled concurrently to the first midplane 212a. The first storage processor assembly 210a is coupled to the first midplane 212a by a connector 213a; and coupled to the second midplane 212b by a connector (not shown). The second storage processor assembly 210b is coupled to the first midplane 212a by a connector 213b; and coupled to the second midplane 212b by a connector 213c (collectively referred to as connectors 213).

In some examples, the first midplane 212a is positioned along an edge (or perimeter) 302a of the computing chassis 202; and the second midplane 212b is positioned along an edge (or perimeter) 302b of the computing chassis 202. The edge 302a can be positioned opposite to the edge 302b. In some examples, the first midplane 212a can be positioned along any position along the edge 302a between an edge 304a and an edge 304b of the computing chassis 202 such that the storage processor assemblies 210 are coupled to the first midplane 212a concurrently. That is, the first midplane 212a can be positioned along the edge 302a proximate to the edge 304a, the edge 304b, or therebetween such that the storage processor assemblies 210 are coupled to the first midplane 212a concurrently. In some examples, the second midplane 212a can be positioned along any position along the edge 302b between the edge 304a and the edge 304b of the computing chassis 202 such that the storage processor assemblies 210 are coupled to the first midplane 212a concurrently. That is, the second midplane 212b can be positioned along the edge 302b proximate to the edge 304a, the edge 304b, or therebetween such that the storage processor assemblies 210 are coupled to the second midplane 212b. Furthermore, when the first midplane 212a is positioned along the edge 302a of the computing chassis 202 and the second midplane 212b is positioned along the edge 302b of the computing chassis 202, the storage processor assemblies 210 are physically defined between the first midplane 212a and the second midplane 212b.

In some examples, the first midplane 212a is positioned along the edge (or perimeter) 304a of the computing chassis 202; and the second midplane 212b is positioned along the edge (or perimeter) 304b of the computing chassis 202. The edge 304a can be positioned opposite to the edge 304b. In some examples, the first midplane 212a can be positioned along any position along the edge 304a between the edge 302a and the edge 302b of the computing chassis 202 such that the storage processor assemblies 210 are coupled to the first midplane 212a concurrently. That is, the first midplane 212a can be positioned along the edge 304a proximate to the edge 302a, the edge 302b, or therebetween such that the storage processor assemblies 210 are coupled to the first midplane 212a concurrently. In some examples, the second midplane 212b can be positioned along any position along the edge 304b between the edge 302a and the edge 302b of the computing chassis 202 such that the storage processor assemblies 210 are coupled to the second midplane 212b concurrently. That is, the second midplane 212b can be positioned along the edge 304b proximate to the edge 302a, the edge 302b, or therebetween such that the storage processor assemblies 210 are coupled to the second midplane 212b concurrently. Furthermore, when the first midplane 212a is positioned along the edge 304a of the computing chassis 202 and the second midplane 212b is positioned along the edge 304b of the computing chassis 202, the storage processor assemblies 210 are physically defined between the first midplane 212a and the second midplane 212b.

In some examples, the first midplane 212a and the second midplane 212b are positioned in an interior of the computing chassis, e.g., between the storage processor assemblies 210 and the storage devices 214. In some examples, the first midplane 212a can be positioned along any position between the storage processor assemblies 210 and the storage devices 214 and between the edges 302a/302b such that the storage processor assemblies 210 are coupled to the first midplane 212a concurrently. That is, the first midplane 212a can be positioned between the storage processor assemblies 210 and the storage devices 214 proximate to the edge 302a, the edge 302b, or therebetween such that the storage processor assemblies 210 are coupled to the first midplane 212a concurrently. In some examples, the second midplane 212b can be positioned along any position between the storage processor assemblies 210 and the storage devices 214 and between the edges 302a/302b such that the storage processor assemblies 210 are coupled to the second midplane 212b concurrently. That is, the second midplane 212b can be positioned between the storage processor assemblies 210 and the storage devices 214 proximate to the edge 302a, the edge 302b, or therebetween such that the storage processor assemblies 210 are coupled to the second midplane 212b concurrently.

In some examples, the midplanes 212 can be positioned in any combination of positions as described herein such that storage processor assemblies 210 are coupled to the first midplane 212a and the second midplane 212b, concurrently.

In some examples, the midplanes 212 are removeable from the computing chassis 210. That is, each of the midplanes 212 can be coupled and decoupled from the computing chassis (e.g., independently removable). In other words, the midplanes 212 are "pluggable" with respect to the computing chassis 202. In some examples, both of the midplanes 212 are coupled (attached) with the computing chassis 202. In some examples, only one of the midplanes 212 are coupled (attached) with the computing chassis 202 at a time. That is, one of the midplanes 212 can be removed (decoupled) from the computing chassis 202 at a time for servicing, maintenance, or similar.

To that end, communication between the first storage processor assembly 210a and the second storage processor assembly 210b is through the first midplane 212a and the second midplane 212b independently. Specifically, the storage processor assemblies 210 can communicate with each other through the first midplane 212a independent of the second midplane 212b; and the storage processor assemblies 210 can communicate with each other through the second midplane 212b independent of the first midplane 212a.

The storage processor assemblies 210 can provide control/management of the storage devices 214. That is, the storage processor assemblies 210 can provide access to data stored by the storage devices 214. In some cases, the storage devices 214 include redundant store of data. In some examples, the storage processor assemblies 210 provide synchronization of data between the storage devices 214. That is, the first storage processor assembly 210a, the second storage processor assembly 210b, or both, provide management of the data stored by the storage devices 214, including synchronization of the data stored by the storage devices 214. For example, the storage processor assemblies 210 can be in communication with each other such that data stored by the storage device 214a is synchronized with the data stored by the storage device 214b. The midplane 212 provides the communication channel(s) or path(s) such that the storage processor assemblies 210 can be in communication with each other such that data stored by the storage device 214a is symphonized with the data stored by the storage device 214b In some examples, the first midplane 212a is redundant of the second midplane 212b (or the second midplane 212b is redundant of the first midplane 212a). Thus, when one of the midplanes 212 is removed from being coupled with the computing chassis 212, malfunctioning, or otherwise inaccessible, the remaining midplane 212 that is coupled with the computing chassis 210 (functioning, and accessible) can be utilized for providing communication between the storage processor assemblies 210. For example, when the first midplane 212a is removed from being coupled with the computing chassis 202 and removed from being coupled to the storage processor assemblies 210 (or otherwise unable to provide communication between the storage processor assemblies 210), the storage processor assemblies 210 can communicate with one another (transmit/receive signals therebetween) utilizing (over) the second midplane 212b. Thus, when the first midplane 212a suffers a fault (or becomes otherwise malfunctioning, or decoupled), access to the data stored by the storage devices 214 is maintained by the storage processor devices 212 communicating through and utilizing the second midplane 212b. Further, for example, when the second midplane 212b is removed from being coupled with the computing chassis 202 and removed from being coupled to the storage processor assemblies 210 (or otherwise unable to provide communication between the storage processor assemblies 210), the storage processor assemblies 210 can communicate with one another (transmit/receive signals therebetween) utilizing (over) the first midplane 212a. Thus, when the second midplane 212b suffers a fault (or becomes otherwise malfunctioning, or decoupled), access to the data stored by the storage devices 214 is maintained by the storage processor devices 212 communicating through and utilizing the first midplane 212a.

As a result, the computing chassis 202 can provide high availability (HA) to the data stored by the storage devices 214.

In some examples, only one of the midplanes 212 are coupled (attached) with the computing chassis 202 at a time. That is, one of the midplanes 212 can be removed (decoupled) from the computing chassis 202 (and decoupled from the storage processor devices 212) at a time for servicing, maintenance, or similar. The other midplane 212 can remain coupled with the computing chassis 202 (and coupled with the storage processor devices 212) to provide communication between the storage processor devices 212 for managing synchronization of the data between the storage devices 214 and access to the data stored by the storage devices 214.

As a result, one of the midplanes 212 can become decoupled from the computing chassis 202 at a time to provide any upgrades to the removed midplane 212, including replacing a portion or an entirety of the removed midplane 212 with a new (or updated/upgraded) midplane while concurrently providing communication between the storage processors devices 212 through the existing midplane for managing synchronization of the data between the storage devices 214 and access to the data stored by the storage devices 214.

In some examples, when one of the storage processor assemblies 210 is removed (e.g., upgraded/updated/repaired) or replaced, the storage processor assembly 210 can include updated/upgraded connectors 213 for interfacing with the midplanes 212. The connectors 213 can be upgraded to allow for enhanced interface speeds and technologies. In some examples, the midplanes 212 can be updated/upgraded based on the updated/upgraded connectors 213 (to match speed/capabilities of the updated/upgraded connectors 213).

In some examples, external access to the storage processor devices 212 and the storage devices 214 can be provided via the midplanes 212. For example, an external storage processor device (external to the computing chassis 202) can access the storage devices 214 via the midplanes 212. The external storage processor device can become coupled to one or more of the midplanes 212 such that communication between the external storage processor device and the storage processor devices 212 is provided for managing synchronization of the data between the storage devices 214 and access to the data stored by the storage devices 214. Thus, the data stored by the storage devices 214 can be migrated (in whole or in part) to other storage devices accessible by the external storage processor device utilizing the midplanes 212.

In some examples, the midplanes 212 can further be coupled to one or more input/output (I/O) computing modules, such as direct peripheral component interconnect express (PCI Express) computing modules, Gen-Z computing modules, networking (ethernet) computing modules, InfiniBand (IB) computing modules, and/or serial attached SCSI (SAS) computing modules. The I/O computing modules can include any high speed serial based protocol computing module.

In some implementations, the computing chassis 202 can further include a third midplane, similar to the first midplane 210a and/or the second midplane 210b. The third midplane can be positioned along any edge 302a, 302b, 304a, 304b, or between the storage processor assemblies 210 and the storage devices 214, similar to that mentioned above with respect to the midplanes 210. The first storage processor assembly 210a and the second storage processor assembly 210b can be coupled concurrently to the third midplane. To that end, communication between the first storage processor assembly 210a and the second storage processor assembly 210b is through the first midplane 212a, the second midplane 212b, and/or the third midplane independently. Specifically, the storage processor assemblies 210 can communicate with each other through the first midplane 212a independent of the second midplane 212b and the third midplane; the storage processor assemblies 210 can communicate with each other through the second midplane 212b independent of the first midplane 212a and the third midplane; and the store processor assemblies 210 can communicate with each through the third midplane independent of the first midplane 212a and the second midplane 212b.

In some implementations, the computing chassis 202 can further include a third storage processor assembly, similar to the first storage processor assembly 210a and the second storage processor assembly 210b. The first storage processor assembly 210a, the second storage processor assembly 210b, and the third storage processor assembly are coupled concurrently to the first midplane 212a. Furthermore, the first storage processor assembly 210a, the second storage processor assembly 210b, and the third storage processor assembly are coupled concurrently to the second midplane 212b. To that end, communication between the first storage processor assembly 210a, the second storage processor assembly 210b and the third storage processor assembly is through the first midplane 212a and the second midplane 212b independently. Specifically, the storage processor assemblies can communicate with each other through the first midplane 212a independent of the second midplane 212b; and the storage processor assemblies can communicate with each other through the second midplane 212b independent of the first midplane 212a.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computing chassis, including:
   a first storage processor assembly;
   a second storage processor assembly;
   a first midplane positioned along a first edge of the computing chassis, wherein the first storage processor assembly and the second storage processor assembly are coupled concurrently to the first midplane;
   a second midplane, wherein the first storage processor assembly and the second storage processor assembly are coupled concurrently to the second midplane; and
   a third midplane positioned along the first edge of the computing chassis, wherein the first storage processor assembly and the second processor assembly are coupled concurrently to the third midplane,
   wherein communication between the first storage processor assembly and the second storage processor assembly is through the first midplane, the second midplane, and the third midplane independently.

2. The computing chassis of claim 1, wherein the second midplane is positioned along a second edge of the computing chassis, wherein the second edge is opposite to the first edge.

3. The computing chassis of claim 2, wherein at least a portion of the first storage processor assembly and the second storage processor assembly are physically defined between the first and the second midplanes.

4. The computing chassis of claim 1, further comprising:
   a third storage processor assembly,
   wherein the first storage processor assembly, the second storage processor assembly, and the third storage processor assembly are coupled concurrently to the first midplane,
   wherein the first storage processor assembly, the second storage processor assembly, and the third storage processor assembly are coupled concurrently to the second midplane.

5. The computing chassis of claim 1, wherein the first and the second midplanes are removable from the computing chassis.

6. The computing chassis of claim 1, wherein the second midplane is redundant to the first midplane.

7. The computing chassis of claim 1, further comprising one or more storage devices coupled to one or more of the first storage processor assembly and the second storage processor assembly.

8. An information handling system, comprising:
   a processor;
   memory media storing instructions executable by the processor to perform operations;
   a computing chassis, including:
      a first storage processor assembly;
      a second storage processor assembly;
      a first midplane positioned along a first edge of the computing chassis, wherein the first storage processor assembly and the second storage processor assembly are coupled concurrently to the first midplane;
      a second midplane, wherein the first storage processor assembly and the second storage processor assembly are coupled concurrently to the second midplane; and
      a third midplane positioned along the first edge of the computing chassis, wherein the first storage processor assembly and the second processor assembly are coupled concurrently to the third midplane,
      wherein communication between the first storage processor assembly and the second storage processor assembly is through the first midplane, the second midplane, and the third midplane independently.

9. The information handling system of claim 8, wherein the second midplane is positioned along a second edge of the computing chassis, wherein the second edge is opposite to the first edge.

10. The information handling system of claim 9, wherein at least a portion of the first storage processor assembly and the second storage processor assembly are physically defined between the first and the second midplanes.

11. The information handling system of claim 8, the computing chassis further comprising:
    a third storage processor assembly,
    wherein the first storage processor assembly, the second storage processor assembly, and the third storage processor assembly are coupled concurrently to the first midplane,
    wherein the first storage processor assembly, the second storage processor assembly, and the third storage processor assembly are coupled concurrently to the second midplane.

12. The information handling system of claim 8, wherein the first and the second midplanes are removable from the computing chassis.

13. The information handling system of claim 8, wherein the second midplane is redundant to the first midplane.

14. The information handling system of claim 8, further comprising one or more storage devices coupled to one or more of the first storage processor assembly and the second storage processor assembly.

* * * * *